US008316302B2

(12) United States Patent
McKoen et al.

(10) Patent No.: US 8,316,302 B2
(45) Date of Patent: Nov. 20, 2012

(54) METHOD AND APPARATUS FOR ANNOTATING VIDEO CONTENT WITH METADATA GENERATED USING SPEECH RECOGNITION TECHNOLOGY

(75) Inventors: Kevin M. McKoen, San Diego, CA (US); Michael A. Grossman, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1232 days.

(21) Appl. No.: 11/747,584

(22) Filed: May 11, 2007

(65) Prior Publication Data
US 2008/0281592 A1  Nov. 13, 2008

(51) Int. Cl.
*G06F 3/16* (2006.01)
(52) U.S. Cl. ........ 715/728; 715/727; 715/202; 715/723; 709/209; 702/189; 369/28.01
(58) Field of Classification Search .................. 715/266, 715/728, 727, 202, 201, 723; 369/28.01, 369/4, 27.01, 47.16; 709/209; 707/104.1, 707/14.61, E17.019; 702/189; 386/38, 39, 386/E9.036, E9.013; 348/E7.071; 704/235, 704/251
See application file for complete search history.

(56) References Cited

U.S. PATENT DOCUMENTS

| 5,241,619 | A | 8/1993 | Schwartz et al. |
| 5,621,859 | A | 4/1997 | Schwartz et al. |
| 6,243,713 | B1 | 6/2001 | Nelson et al. |
| 6,988,245 | B2 | 1/2006 | Janevski |
| 7,133,862 | B2 * | 11/2006 | Hubert et al. ........................ 1/1 |
| 7,496,767 | B2 | 2/2009 | Evans |
| 2002/0065074 | A1 | 5/2002 | Cohn et al. |
| 2002/0099947 | A1 | 7/2002 | Evans |
| 2002/0152474 | A1 * | 10/2002 | Dudkiewicz ................. 725/136 |
| 2002/0184195 | A1 | 12/2002 | Qian |
| 2003/0091337 | A1 | 5/2003 | Kubsch et al. |
| 2003/0093790 | A1 * | 5/2003 | Logan et al. .................... 725/38 |
| 2003/0177503 | A1 | 9/2003 | Sull et al. |
| 2003/0229900 | A1 * | 12/2003 | Reisman ......................... 725/87 |
| 2003/0231198 | A1 | 12/2003 | Janevski |
| 2004/0031058 | A1 * | 2/2004 | Reisman ....................... 725/112 |

(Continued)

FOREIGN PATENT DOCUMENTS
WO   0228059   4/2002
(Continued)

OTHER PUBLICATIONS

Jeroen Vendrig et al, "Interactive Adaptive Movie Annotation", IEEE Computer Society, Jul.-Sep. 2003, 1070-986X, pp. 30-37 (attached).

(Continued)

*Primary Examiner* — Vijay B Chawan
(74) *Attorney, Agent, or Firm* — Stewart M. Wiener

(57) ABSTRACT

A method and apparatus is provided for annotating video content with metadata generated using speech recognition technology. The method begins by rendering video content on a display device. A segment of speech is received from a user such that the speech segment annotates a portion of the video content currently being rendered. The speech segment is converted to a text-segment and the text-segment is associated with the rendered portion of the video content. The text segment is stored in a selectively retrievable manner so that it is associated with the rendered portion of the video content.

18 Claims, 6 Drawing Sheets

U.S. PATENT DOCUMENTS

| | | | |
|---|---|---|---|
| 2004/0181747 A1* | 9/2004 | Hull et al. ................... | 715/500.1 |
| 2004/0210946 A1 | 10/2004 | Shin | |
| 2005/0154973 A1* | 7/2005 | Otsuka et al. .............. | 715/501.1 |
| 2005/0165816 A1 | 7/2005 | Schiller et al. | |
| 2005/0198570 A1* | 9/2005 | Otsuka et al. ................ | 715/515 |
| 2006/0047952 A1 | 3/2006 | Van Den Heuvel et al. | |
| 2006/0064716 A1 | 3/2006 | Sull et al. | |
| 2006/0074887 A1 | 4/2006 | Lee et al. | |
| 2006/0107301 A1 | 5/2006 | Leibbrandt et al. | |
| 2006/0150234 A1 | 7/2006 | Lee et al. | |
| 2006/0174310 A1 | 8/2006 | Lee et al. | |
| 2006/0264209 A1 | 11/2006 | Atkinson et al. | |
| 2007/0106680 A1* | 5/2007 | Haot et al. .................... | 707/100 |
| 2007/0106685 A1* | 5/2007 | Houh et al. ................... | 707/102 |
| 2007/0250901 A1* | 10/2007 | McIntire et al. .............. | 725/146 |
| 2008/0092181 A1* | 4/2008 | Britt ............................... | 725/87 |

FOREIGN PATENT DOCUMENTS

| | | |
|---|---|---|
| WO | 02097672 | 12/2002 |
| WO | 2004086254 | 10/2004 |

OTHER PUBLICATIONS

Tele Tan et al, "Smart Album—Towards Unification of Approaches for Image Retrieval", IEEE Computer Society, 2002, 1051-4651, 4 pages (attached).

Rainer Lienhart, "A System for Effortless Content Annotation to Unfold the Semantics in Videos", IEEE, 2000, 5 pages (attached).

Chitra L. Madhwacharyula et al, "An Information-integration Approach to Designing Digital Video Albums", School of Computing/IPAL-CNRS, National University of Singapore, 5 pages. No date, but before date of the instant application (attached).

Jean-Pierre Evain, TV Anytime a Preliminary Specification on Schedule!, Metadata, Sep. 2000, 14 pages. http://www.tv-anytime.org (attached).

"The TV-Anytime Forum: Specification Series: S-3 On: Metadata", Aug. 17, 2001, 66 pages, http://www.tv-anytime.org (attached in 2 parts).

Sonera MediaLab, "MPEG-7 White Paper", Oct. 13, 2003, 12 pages (attached).

Office Action, Korean App. No. 10-2009-7023571 (English Text & Foreign Translation), Mar. 14, 2011.

PCT Search Report and Written Opinion, RE: Application No. PCT/US08/61718 (Aug. 26, 2008).

Anastasia Karanastasi, et al., "A natural language model for managing TV-Anytime information in mobile environments", Personal and Ubiquitous Computing, vol. 9, No. 5, Springer-Verlag London, pp. 262-272 (published online Apr. 28, 2005).

Gabriella Kazai, et al., "Searching Annotated Broadcast Content on Mobile and Stationary Devices," Proceedings of the Iadis International Conference Applied Computing 2004, Lisbon, Portugal, IADIS Press, pp. II-249-II-252 (Mar. 2004).

Fotis G. Kazasis et al., "Designing Ubiquitous Personalized TV-Anytime Services," 15th Conference on Advanced Information Systems Engineering (CAiSE '03), Klagenfurt/Velden, Austria, Jun. 16-20, 2003, Workshops Proceedings, Information Systems for a Connected Society. CEUR Workshop Proceedings 75 CEUR-WS.org 2003, ISBN 86-435-0552-8, pp. 136-149 (Jun. 2003).

A. Hickman, "Enhancing TV-Anytime with Metadata from a Bi-Directional Channel," Philips Research Laboratories, UK, Proceedings of International Broadcast Conference (IBC) 2002, Amsterdam, Netherlands (Sep. 2002).

H-K. Lee et al., "An Effective Architecture of Advanced TV Set-Top and Interactive Services Using TV-Anytime Metadata," Electronics and Telecommunications Research Institute, Korea, in Proceedings of International Broadcast Conference (IBC) 2002, Amsterdam, Netherlands (Sep. 2002).

Gregory D. Abowd et al., "The Family Video Archive: An annotation and browsing environment for home movies," Proceedings of the 5th ACM SIGMM International Workshop on Multimedia Information Retrieval (MIR'03), Berkeley, California (Nov. 2003).

Virage, Inc., "Virage SmartEncode featuring VideoLogger", available at web.archive.org/web/20080116062209/http://www.virage.com/content/products/vs_smartencode/, captured Jan. 16, 2008.

Virage, Inc., "Datasheet: VideoLogger", 2 pages, 2003.

BBN Technologies Corp., "Podzinger: FAQ", available at web.archive.org/web/20061114071547/http://www.podzinger.com/about.jsp?section=faq, captured Nov. 14, 2006.

Japanese Office Action for Japanese Patent Application No. 2010-506550, issued Mar. 27, 2012. (foreign text and English summary).

Japanese National Phase Laid-Open Publication No. 2006-515138, dated May 18, 2006. (foreign text and English translation).

Japanese Laid-Open Publication No. 2005-182460, dated Jul. 7, 2005. (foreign text and English translation).

Japanese Laid-Open Publication No. 2002-278844, dated Sep. 27, 2002. (foreign text and English abstract).

* cited by examiner

METHOD AND APPARATUS FOR ANNOTATING VIDEO CONTENT WITH METADATA GENERATED USING SPEECH RECOGNITION TECHNOLOGY

FIELD OF THE INVENTION

The present invention relates generally to a method and apparatus for annotating video content, and more particularly to a method and apparatus for annotating video content with metadata that is converted to text from speech.

BACKGROUND OF THE INVENTION

Consumers are more and more often recording family events, travel experiences and the like using digital video recording techniques. Today's advanced home video camera technologies allow huge amounts of such "home-grown" and other video data to be conveniently recorded and stored. For example, future generations of digital video recorders (DVRs) will provide storage capacities measured in terabytes. The more storage available, the more content the user will be likely to store. Services are also commonplace to convert older analog video formats such as film into more modern digital formats, increasing the quantity of digital video material even more. Commercial video editing products also allow for the creation of videos that greatly increase the quality and presentation of home movies.

Unfortunately, as easy as it is to record and edit family and other movies, archiving and retrieving them is not quite as simple. Unlike a stack of photos, a collection of home movies is not easily browsed. Finding a particular segment of content depends on identifying the specific item, which means that the item has to be categorized. For commercially produced movies and songs there are a number of services available today which provide detailed metadata (e.g. Internet Movie Database IMDb for movies, CDDB for music). But to be of real use for the management of large amounts of content, this metadata should stored in conjunction with the related content and presented to the user as one coherent item.

Recently, a number of standards such as MPEG-7 and TV-AnyTime have been developed which allow features of multimedia content to be described so that users can search for, browse and retrieve that content as efficiently and effectively as today's text-based search engines. These standards generally use a set of audio-visual metadata elements. Such so-called multimedia content management systems are already widely used in commercial contexts by content creators/owners and service providers/broadcasters. For example, in the case of DVD movies, metadata is often provided as part of the content itself so that users can access a specific part of a video through a "chapter selection" interface. Access to specific segments of the recorded program requires segmentation information concerning a program that describes a title, category, start position and duration of each segment, which is generated through a process called "video indexing". To access a specific segment without the segmentation information of a program, viewers would have to linearly search through the program from the beginning, such as by using the fast forward button, which is a cumbersome and time-consuming process.

In another commercial context, third party service providers such as broadcasters may add metadata along with the associated content. For example, one such metadata source is an electronic program guide that is made available by some cable and satellite TV providers. EPG metadata includes a title, time of broadcast, and a brief description of the broadcasts.

Unlike commercially produced video, home movies generally contain little if any, metadata concerning their content which would allow them to be cataloged, searched and retrieved. Moreover, unlike the commercial context in which well defined metadata such as that available in an EPG can be used, consumers may often desire to index and retrieve movies in more idiosyncratic ways which do not lend themselves to the use of a limited number of descriptors. Even if consumers were to author metadata themselves, the process can be inconvenient and time-consuming.

SUMMARY OF THE INVENTION

In accordance with the present invention, a method and apparatus is provided for annotating video content with metadata generated using speech recognition technology. The method begins by rendering video content on a display device. A segment of speech is received from a user such that the speech segment annotates a portion of the video content currently being rendered. The speech segment is converted to a text-segment and the text-segment is associated with the rendered portion of the video content. The text segment is stored in a selectively retrievable manner so that it is associated with the rendered portion of the video content.

In accordance with one aspect of the invention, a signal may be received from the user selecting an operational state before receiving the segment of speech.

In accordance with another aspect of the invention, the operational state may be selected from the group consisting of an annotate state, a narrate state, a commentary state, an analyze state and a review/edit state.

In accordance with another aspect of the invention, the video content may be rendered by a set top box.

In accordance with another aspect of the invention, the video content may be rendered by a DVR.

In accordance with another aspect of the invention, the set top box may receive the video content from a video camera.

In accordance with another aspect of the invention, the DVR may receive the video content from a video camera.

In accordance with another aspect of the invention, the user may be presented with a plurality of different user-selectable operational states defining a mode in which the speech request is to be received.

In accordance with another aspect of the invention, the user-selectable operational states may be presented as a GUI on the display device.

In accordance with another aspect of the invention, the GUI may be superimposed over the video content being rendered.

DETAILED DESCRIPTION

Described herein is a method and apparatus for archiving and annotating a large collection of home movies, turning the browsing and assembling of video into a simple and even enjoyable task. As described in more detail below, video information from a video camera or the like is transferred to a video storage device that includes a voice-based metadata generation module. As the video on the storage device is being displayed, the end-user uses a microphone or other voice input device to annotate the video. The speech undergoes speech-to-text conversion to provide a source of metadata that can be used to catalogue, search and retrieve the locally stored video. Some of the metadata may include in-depth descriptions and details concerning the content.

In one illustrative scenario, a user may wish to provide searchable access to a video of a recent family vacation. The user may wish to identify segments of the video by their location and the family members or other individuals appearing in the video segments. If, for instance, a first segment of video was recorded on a ski slope and a second portion was recorded in a ski lodge, the user may verbally describe the ski slope, pointing out say, that Tim and Beth are skiing, while the first segment is being played or otherwise rendered. Likewise, when the second video segment is being played, the user may describe the ski lodge in whatever detail is desired and identify those individuals who are present. In this way the user can continue to narrate the entire video.

Figure 1:
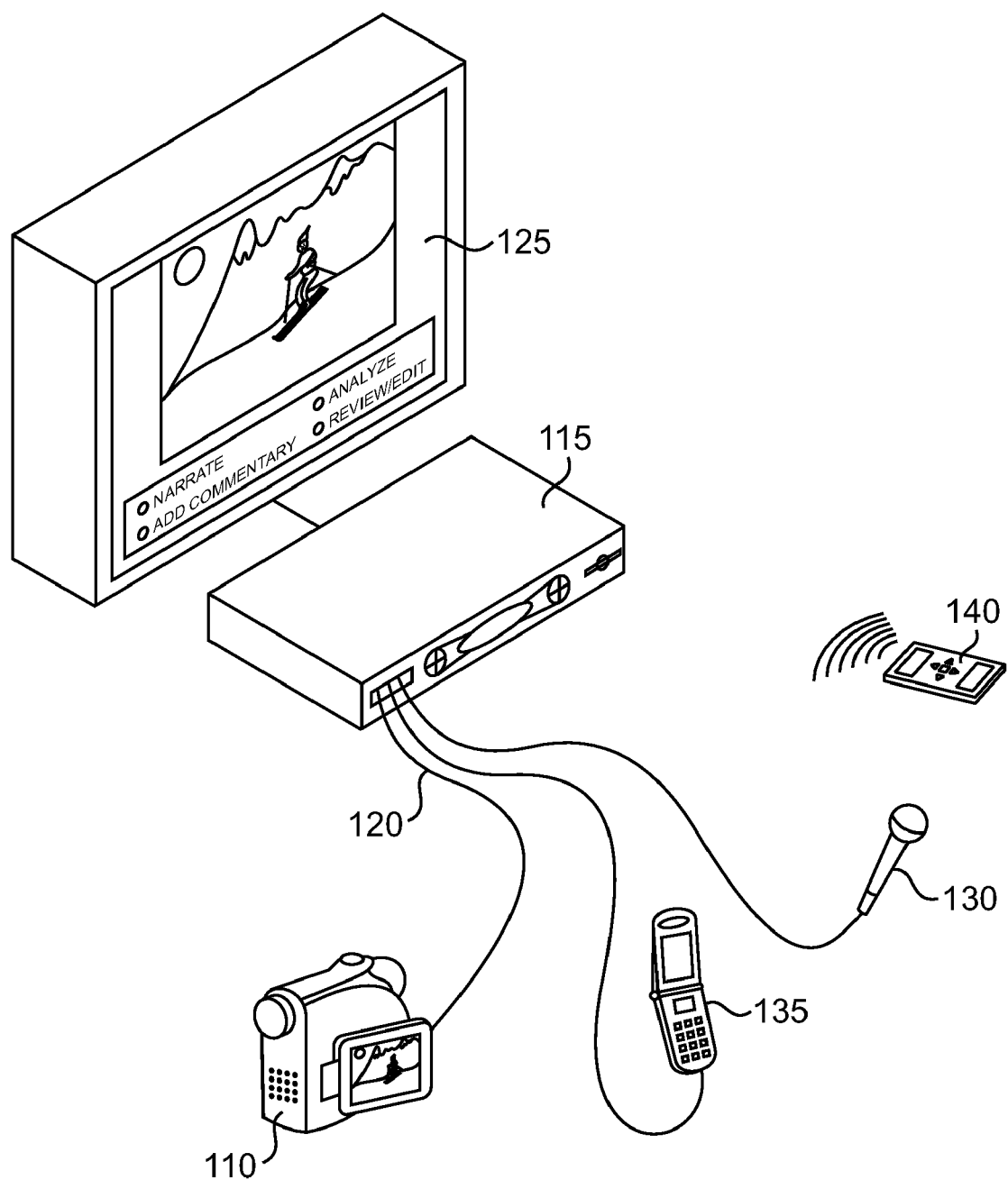
FIG. 1 shows an arrangement for transferring video information from a digital video camera to a video storage device such as a digital video recorder (DVR).

FIG. 1 shows an arrangement for transferring video information from a digital video camera 110 to a video storage device such as a digital video recorder (DVR) 115. The DVR 115 and the digital video camera 110 include interfaces conforming to an appropriate standard (e.g., IEEE 1394) and are connected by a cable 120 conforming to the standard. Thus, the recorder 115 and the video camera 110 can recognize each other and communicate with each other. A display device 125 such as a computer monitor or television is connected to the digital video recorder 115 for displaying the video content stored on the recorder 115.

Also shown in FIG. 1 are a variety of voice input devices that are connected to the digital video recorder 115, any of which may be employed by the user to annotate the video. In particular, the voice input devices that are depicted include a microphone 130, cellular phone 135, and a remote control unit 135 equipped with a built-in microphone. It should be noted that while the video recorder 115 is depicted as being in communication with the digital video camera 110, microphone 130, cellular phone 135, and remote control unit 135 over wired links, they may alternatively be in communication with the video recorder 115 over a wireless link.

The digital video recorder 115 includes a voice-based metadata generation module, described in more detail below, which receives the speech from one or more of the voice input devices. The metadata generation module includes a speech recognition component for converting speech to text. The resulting text is used by the metadata generation module to generate metadata for the video.

Figure 2:
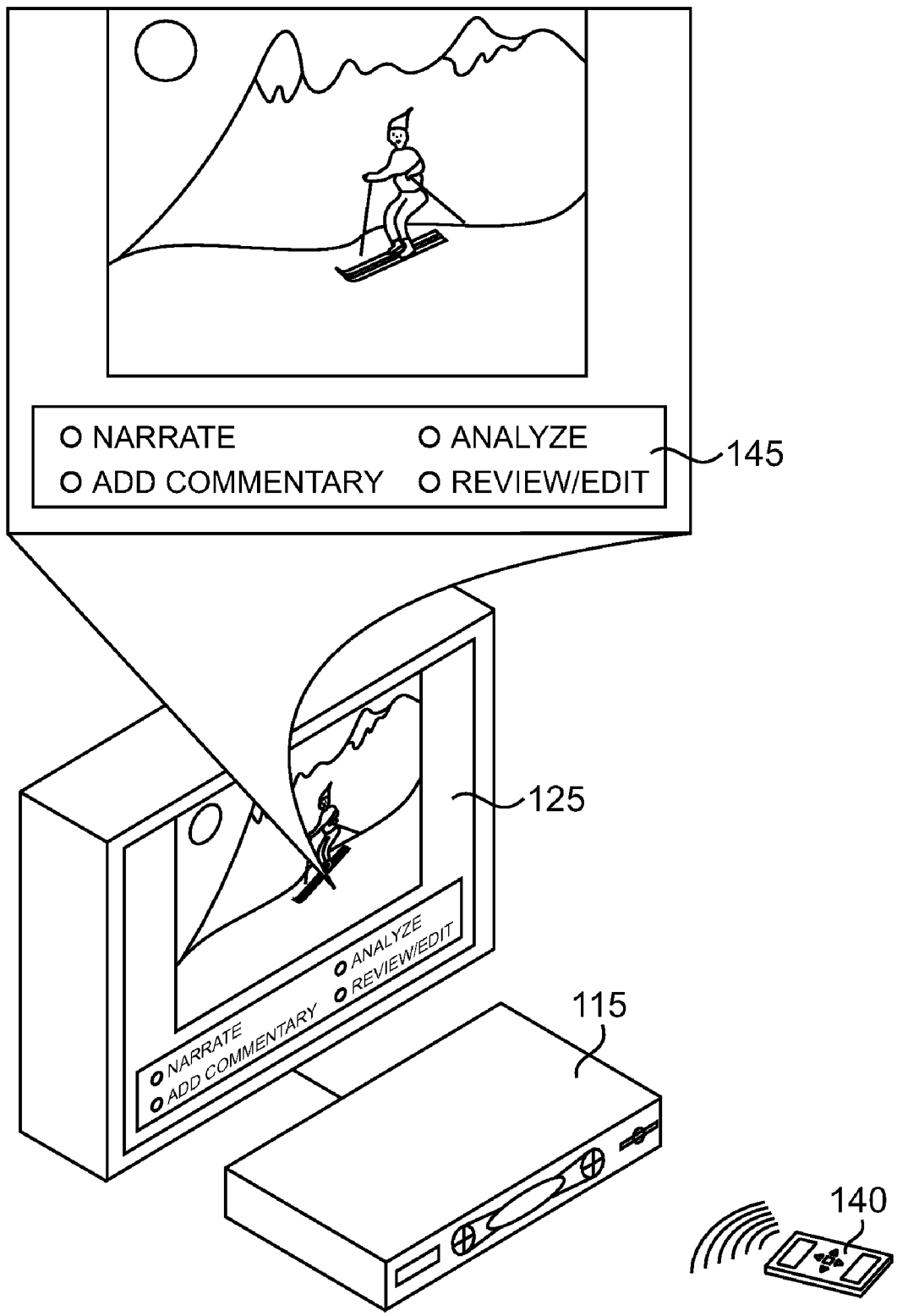
FIG. 2 shows a screen shot on a display device in which a graphical user interface (GUI) representing a series of menu choices is superimposed over the video.

FIG. 2 shows a screen shot on the display device. The video stored on the DVR 115 is displayed along with a graphical user interface (GUI) 145 that is superimposed on top of the video. The GUI 145 includes a series of menu choices from among which the user can select using an appropriate user input device such as a remote control unit. The various menu choices will be described in more detail below in connection with the operational states of the metadata generation module.

It should be noted that the video storage device on which the video is transferred from the video camera is not limited to a digital video recorder 115 as depicted in FIGS. 1 and 2. More generally, the video storage device may be implemented in a wide variety of different devices or combination of devices capable of receiving, recording and playing back a video signal. For example, the video storage device may be a set-top box, television, personal computer, PDA and the like. For purposes of illustration, the video storage device in which the metadata generation module is incorporated will be depicted in FIG. 3 as a set-top box equipped with a DVR subsystem.

Figure 3:
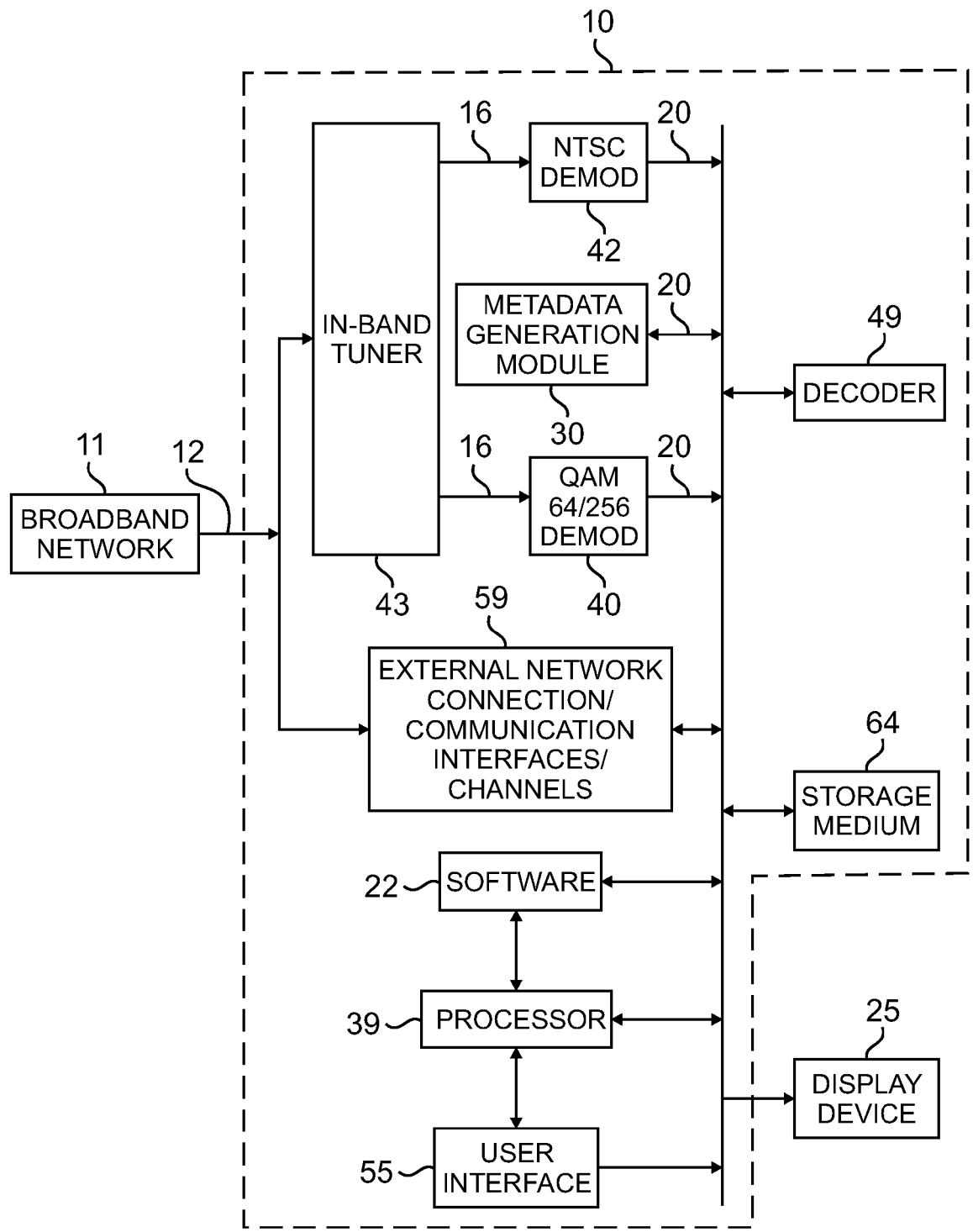
FIG. 3 shows an illustrative set-top box equipped with a DVR subsystem.

Referring to FIG. 3, set top box 10 includes external network connection/communication interfaces 59, which support devices such as modems, streaming media players and other network connection support devices and/or software, coupled through local or wide area networks (e.g., broadband network 11) to program providers and providers of other content, such as advertising content. Communication interfaces 59 also include the appropriate connections for connecting the video camera 110 and various input devices depicted in FIG. 1.

Set top box 10 further includes an in-band tuner 43, which tunes to a channel signal 16 selected by a viewer via user interface 55. As mentioned in connection with FIG. 1, user interface 55 may be any type of known or future device or technology allowing the consumer to select channels or programs the consumer wishes to receive, such as a remote control, mouse, microphone, keyboard, or touch-screen display associated with a personal video recorder.

Channel signal 16 includes video and/or audio components. Demodulators 40 and 42 are responsive to in-band tuner 43. Demodulator 40, which may be a 64/256 quadrature amplitude modulation demodulator, for example, is responsive to receive a digital version of channel signal 16. Demodulator 40 identifies digital data packets from one or more digital sources, such as a Moving Pictures Experts' Group (MPEG) transport stream, a high-definition television stream, or a media stream from an external network connection 59, such as a cable modem, using well-known methods and techniques. Demodulator 42, which may be an NTSC demodulator, for example, is responsive to receive an analog version of channel signal 16 and to decode signals and markers according to well-known methods and techniques. Demodulators 40 and 42 are operative to output video information 20.

Video information 20 includes raw video or audio data, arranged for formatting in accordance with a predetermined media format. Video information 20 is preferably arranged in accordance with an MPEG media format, such as the MPEG-2 media format, but may be arranged in accordance with other media formats, including but not limited to other MPEG formats, Hypertext Markup Language (HTML), Virtual Reality Modeling Language (VRML), extensible markup language (XML), H.261, or H.263 formats.

Storage medium 64 is responsive to receive, among other things, encoded video signal 20 for storage. Storage medium 64 may be any local or remote device, now known or later developed, capable of recording data, including but not limited to a hard disk drive, a videocassette recorder tape, all types of optical storage media such as compact disks and digital videodisks, a magnetic tape, a home router, or a server.

The video transferred from the video camera 115 in FIG. 1 is received by connection/communication interfaces 59 and stored in storage medium 64.

Decoder 49 is responsive to receive recorded encoded video signal 20 from storage medium 64, and to play back recorded encoded video signal 20 via display device 25, in response to instructions from user interface 55. Decoder 49 is also responsive to receive and pass through video programming directly from tuner 43. Internal arrangements of decoder 49 are well known—decoder 49 may include analog-to-digital converters, one or more storage media and/or buffers, and general or special-purpose processors or application-specific integrated circuits, along with demultiplexors for demultiplexing and/or synchronizing at least two transport streams, for example, video and audio. Video and audio decoders and/or analog and digital decoders may be separate, with communication between separate decoders allowing for synchronization, error correction and control.

Metadata generation module 30 allows a user to create, review and revise metadata that is obtained from a spoken word stream while the video is being played. The metadata generation module 30 may represent the metadata in any appropriate format. For example, the TV-Anytime forum has published metadata specifications which define the data structures that allow consumers to find, navigate and manage content. The "TV-Anytime" standard is an emerging standard which is defined by the TV-Anytime forum. In the TV-Anytime standard, the metadata is represented in XML. Similarly, an MPEG standard for the effective and efficient access to multimedia content (ISO/IEC 15938: Information Technology—Multimedia content description interface), MPEG-7, offers metadata elements and their structure and relationships, which are defined in the form of Descriptors and Description Schemes to create descriptions of the multimedia content. MPEG-7 specifies a standard set of description tools which can be used to describe various types of multimedia information. MPEG-7 does not replace earlier MPEG standards, as its objective is to provide additional functionality to other MPEG standards. Earlier MPEG standards make the content available, while MPEG-7 allows finding the content the user needs.

Regardless of format, the metadata may be physically located with the associated video, either in the same data stream or on the same local storage medium, but the metadata descriptions could also be located somewhere else, such as on a network. If the content and its metadata descriptions are not co-located, a mechanism that links these two is employed, such as a content identifier, for example.

Also shown in FIG. 3 is a display device 25, which includes speakers for outputting audio signals, displaying video programming received from tuner 43 or storage medium 64. Display device 25 is responsive to receive analog or digital signals, including but not limited to S-video, composite audio-video, SPDIF, and DVI.

Processor 39 and software 22 are illustrated functionally, and are responsive to various elements of set top box 10, including demodulators 40 and 42, storage medium 64, decoder 49 and metadata generation module 30. When loaded into a processor, such as processor 39, software 22 is operative to control encoding, recording and playback of encoded video signal 20. It will be appreciated, however, that aspects of the set top box are not limited to any specific embodiments of computer software or signal processing methods. For example, one or more processors packaged together or with other elements of set top box 10 may implement functions of processor 39 in a variety of ways. It will also be appreciated that software 22 may be any stored instructions, in one or more parts (stored, for example, on storage medium 64, or another internal or external storage medium such as a read-only-memory or a random-access memory) electronically controlling functions provided by DVR system 10, including firmware, and may be used or implemented by one or more elements, including one or more processors, of set top box 10.

Figure 4:
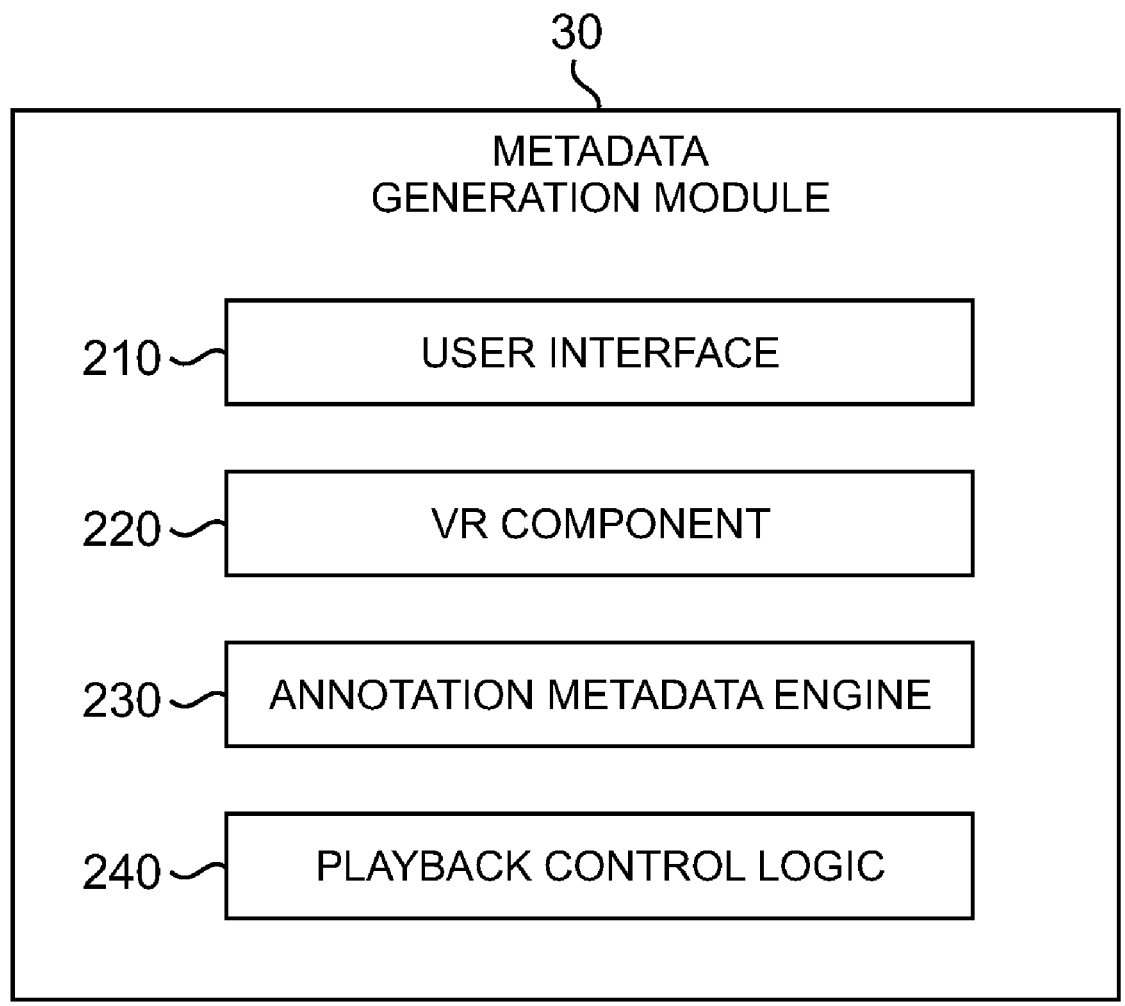
FIG. 4 shows one example of an architecture that may be employed by the metadata generation module depicted in FIG. 3.

FIG. 4 shows one example of an architecture that may be employed by the metadata generation module 30. The metadata generation module 30 includes a user interface component 210, a voice recognition component 220, an annotation metadata engine 230, and playback control logic 240. The user interface component 210 displays GUI screen shots, such as shown in FIG. 2 for example, plus the other interactive functionalities needed to enable user control over the annotation. The voice-recognition component 220, also referred to as the speech recognition component, performs the voice recognition. Hereinafter, the terms "speech recognition" and "voice recognition" are interchangeably used. The voice recognition component 220 may be either a speaker dependent speech recognition unit or a speaker independent speech recognition unit. Such conventional voice recognition components are well known in the art and thus do not need to be discussed in detail. Generally, in a speaker dependent speech recognition configuration a speaker is identified, and only words or phrases which are spoken by the identified speaker are recognized. In a speaker independent speech recognition configuration specific words are recognized, regardless of the person who speaks them.

The annotation metadata engine 230 generates the metadata from the text that is provided by the voice-recognition component using any appropriate format such as the aforementioned TV-Anytime and MPEG-7 standards. The annotation metadata engine 230 also inserts the metadata into an appropriate database record or file or directly into the MPEG bitstream. The playback control logic 240 coordinates the playback of the video stream with the incorporation of the metadata that is received from the user. It should be noted that the metadata generation module 30 can reside in a software application, firmware or hardware layer, or in any combination thereof. For example, in some cases the metadata generation module may be implemented in hardware using an ASIC along with associated firmware.

Figure 5:
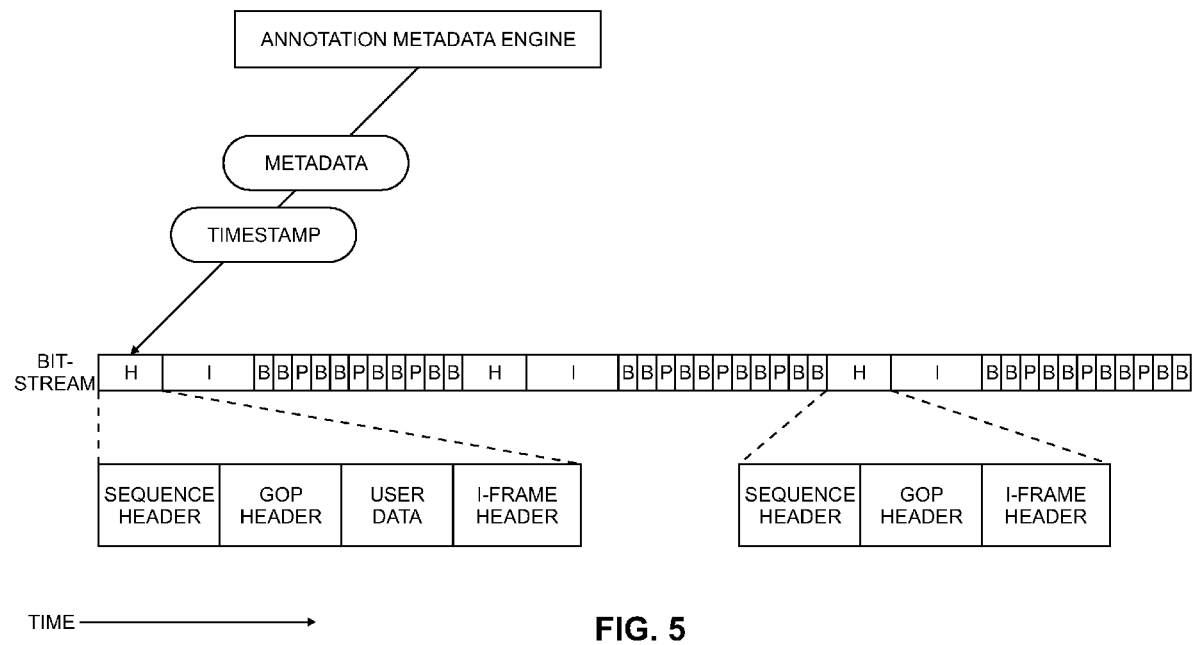
FIG. 5 shows an illustrative MPEG digital video transport stream or sequence in which, in some examples, the metadata may be inserted.

Metadata generation module 30 can establish the association between the metadata and the video in any number of different ways. For instance, as previously mentioned, the metadata may be stored in a database record. Alternatively, in another example, metadata generation module 30 inserts the metadata into the digital bitstream. FIG. 5 shows the sequence headers in an illustrative MPEG digital video transport stream or sequence. Of course, an MPEG stream is shown for illustrative purposes only. The techniques described herein are more generally applicable to a digitally encoded video stream that conforms to any appropriate standard. Typically, the succession of frames comprising such a video sequence is divided for convenience into groups of frames or groups of pictures (GOP). The MPEG standard defines a sequence layer and a GOP layer. The sequence layer begins with a sequence header and ends with a sequence end. The sequence layer comprises more than one GOP. The GOP layer begins with a GOP header and comprises a plurality of pictures or frames. The first frame is generally an I-picture, followed by a P-picture and a B-picture. MPEG provides flexibility as to the use, size, and make up of the GOP, but a 12-frame GOP is typical for a 25 frames per second system frame rate and a 15-frame GOP is typical for a 30 frames per second system. As shown, the annotation metadata engine inserts the metadata and an associated time-stamp as user data bits into the headers associated with the video stream. In this way the metadata will be available to the MPEG decoder resident on set top box so it can be extracted, synchronized with the video stream and perhaps even displayed on the screen as either a caption or subtitle.

Figure 6:
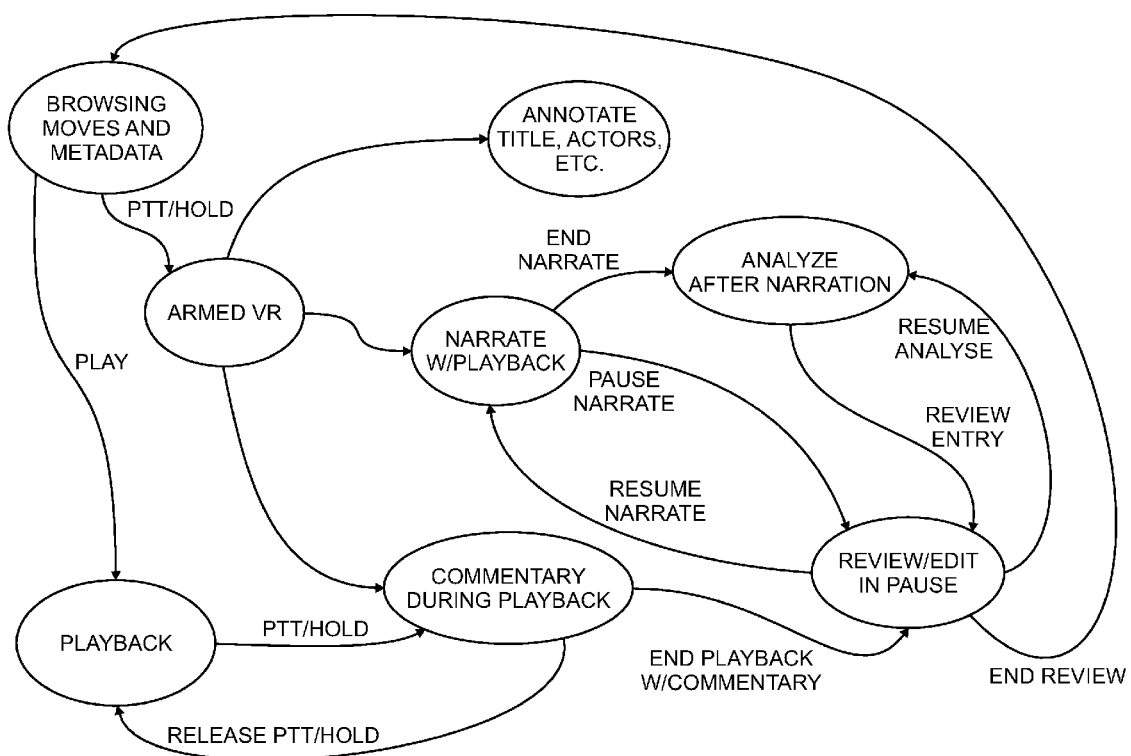
FIG. 6 is an illustrative state diagram showing one particular example of the various operational states of the metadata generation module from among which the user may select.

The metadata generation module 30 may be operable in a number of different states so that the user can easily and conveniently annotate a video. FIG. 6 is an illustrative state diagram showing one particular example of the various operational states of the metadata generation module 30 from among which the user may select. Of course, these states are presented by way of illustration only and are not to be construed as limiting in any way. Each of the various states may be entered using an appropriate user input device such as a remote control unit that is associated with the video storage device. The various states from among which the user selects may be presented on the display device, such as shown in FIG. 1.

The user may begin the annotation process while the video is being transferred from the video camera to the video storage device or after the transfer has already been performed. The user first activates or arms the metadata generation module 30 by entering an armed voice-recognition annotation state, which serves as an entry point to the other states, which include an annotate state, a narrate state, a commentary state, an analyze state and a review/edit state.

In the annotate state, the user simply responds to predefined questions or categories that are presented on the display device. For instance, the user may be asked to enter a title, topic, date and location of the video. The annotate state is thus used to provide basic information about the video similar in type to the information that may be found, for example, in an EPG for a broadcast program. In the narrate state the user can provide a more detailed and comprehensive description of the video as it is being displayed. In this state the user can annotate in whatever detail is desired each and every scene or segment of the video or selected scenes or segments. In the narrate state the voice recognition component will typically remain in an active state throughout the playback of the video so that the user can describe any portion of it as it is displayed on the screen. The user can fast-forward, rewind and pause the video at any point.

The commentary state is similar to the narrate state except that the default state of the voice recognition component will typically be inactive throughout the playback of the video. This state is most convenient to use when the user is primarily watching the video but does not anticipate adding a running commentary. On those occasions when the user does wish to add a description, he or she must activate the voice recognition component with the user interface by, for example, actuating a press-to-talk button. Once again, the user can fast-forward, rewind and pause the video at any point.

The analyze state serves as a description checker analogous to a spell-checker. The analyze state will generally be entered manually or automatically after completion of the narrate state. This state highlights for the user such items as ambiguous words or phrases, scenes or segments that lack a description, or anything else that might suggest there is an irregularity in the text that has been converted from the user's speech. If the user in fact wishes to modify any of the descriptions, the user enters the review/edit state to do so.

The edit/review state may be entered from any number of other states. For instance, it is accessible during the narration state to refine the content. It may also be entered to correct a description while in the commentary state or at the end of the commentary state. In the edit/review state playback of the video is paused and the current description is displayed on the screen along with a substitute line in which the new description is added.

It should be noted that while a convenient method of annotating video with the use of metadata has been presented above, the manner in which a search engine or other application is used to search, access and otherwise make use of the metadata is not restricted. Rather, the metadata may be queried in any way available to those of ordinary skill in the art.

The invention claimed is:

1. At least one non-transitory computer-readable medium encoded with instructions which, when executed by a processor, performs a method including:
    rendering video content on a display device;
    receiving a segment of speech from a user such that the speech segment annotates a portion of the video content currently being rendered;
    converting the speech segment to a text-segment;
    associating the text-segment with the portion of the video content; and
    storing in a selectively retrievable manner the text-segment so that it is associated with the rendered portion of the video content.

2. The computer-readable medium of claim 1 further comprising receiving a signal from the user selecting an operational state before receiving the segment of speech.

3. The computer-readable medium of claim 2 wherein the operational state is selected from the group consisting of an annotate state, a narrate state, a commentary state, an analyze state and a review/edit state.

4. The computer-readable medium of claim 2 wherein the user-selectable operational states are presented as a GUI on the display device.

5. The computer-readable medium of claim 4 wherein the GUI is superimposed over the video content being rendered.

6. The computer-readable medium of claim 1 wherein the video content is rendered by a set top box.

7. The computer-readable medium of claim 1 wherein the video content is rendered by a DVR.

8. The computer-readable medium of claim 6 wherein the set top box receives the video content from a video camera.

9. The computer-readable medium of claim 7 wherein the DVR receives the video content from a video camera.

10. The computer-readable medium of claim 1 further comprising presenting the user with a plurality of different user-selectable operational states defining a mode in which the speech request is to be received.

11. An apparatus for rendering a video program, comprising:
    a computer-readable storage medium; and
    a processor responsive to the computer-readable storage medium and to a software program, the software program, when loaded into the processor, operative to:
    render the video content on a display device;
    receive a segment of speech from a user such that the speech segment annotates a portion of the video content currently being rendered;
    convert the speech segment to a text-segment;
    associate the text-segment with the portion of the video content; and
    store in a selectively retrievable manner the text-segment so that it is associated with the rendered portion of the video content.

12. The apparatus of claim 11 further comprising:
    a receiver/tuner for receiving programming content over a broadband communications system; and a decoder for decoding programming content provided by the receiver/tuner.

13. The apparatus of claim 11 wherein the processor is further configured to receive a signal from the user selecting an operational state before receiving the segment of speech.

14. The apparatus of claim 13 wherein the operational state is selected from the group consisting of an annotate state, a narrate state, a commentary state, an analyze state and a review/edit state.

15. The apparatus of claim 11 wherein the processor is further configured to receive the video content from a video camera.

16. The apparatus of claim 11 wherein the processor is further configured to present the user with a plurality of different user-selectable operational states defining a mode in which the speech request is to be received.

17. The apparatus of claim 16 wherein the user-selectable operational states are presented as a GUI on the display device.

18. The apparatus of claim 17 wherein the GUI is superimposed over the video content being rendered.

* * * * *